Oct. 1, 1929.  P. M. BOURDON  1,730,261
METAL RIM FOR USE WITH PNEUMATIC TIRES
Filed July 25, 1928   3 Sheets-Sheet 1

Inventor
Pierre Marcel Bourdon
by
Wilkinson & Giusta
Attorneys.

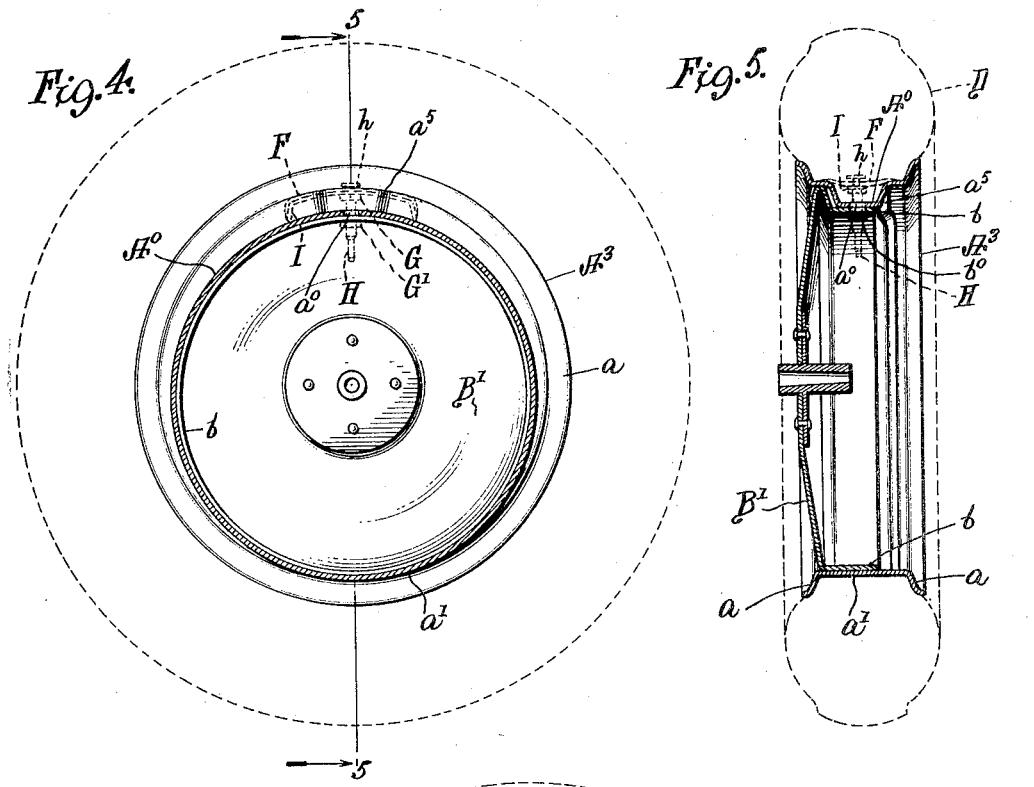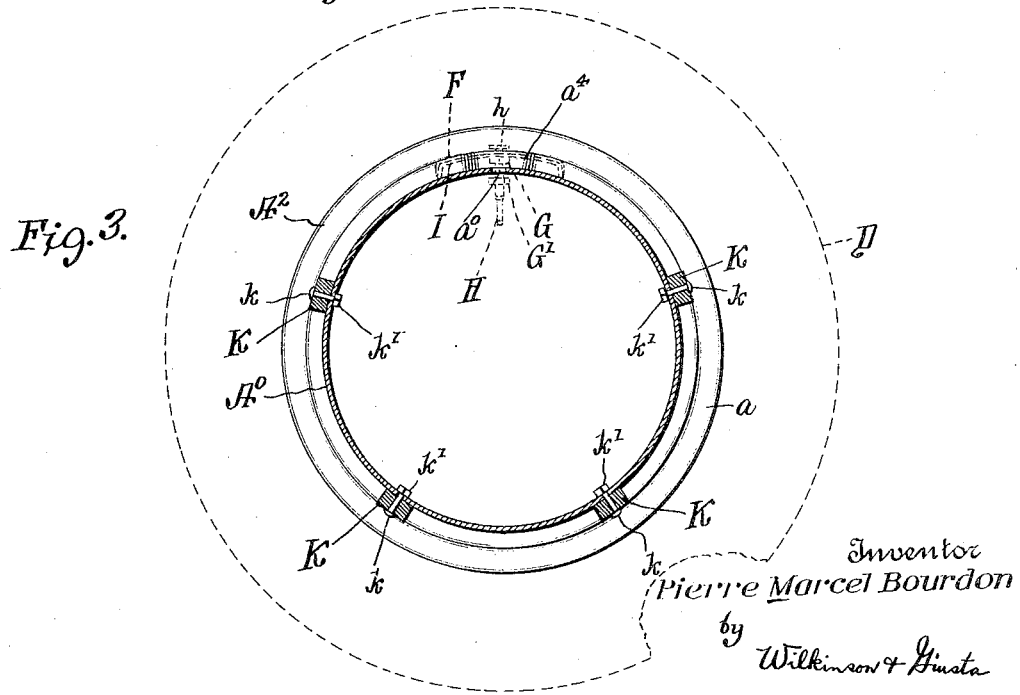

Oct. 1, 1929.   P. M. BOURDON   1,730,261
METAL RIM FOR USE WITH PNEUMATIC TIRES
Filed July 25, 1928   3 Sheets-Sheet 3
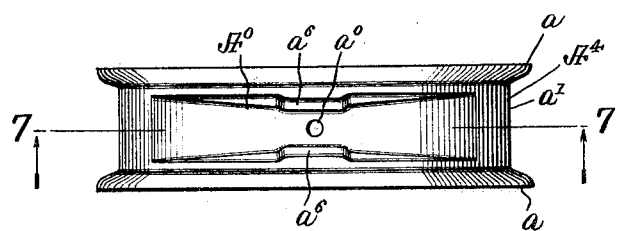
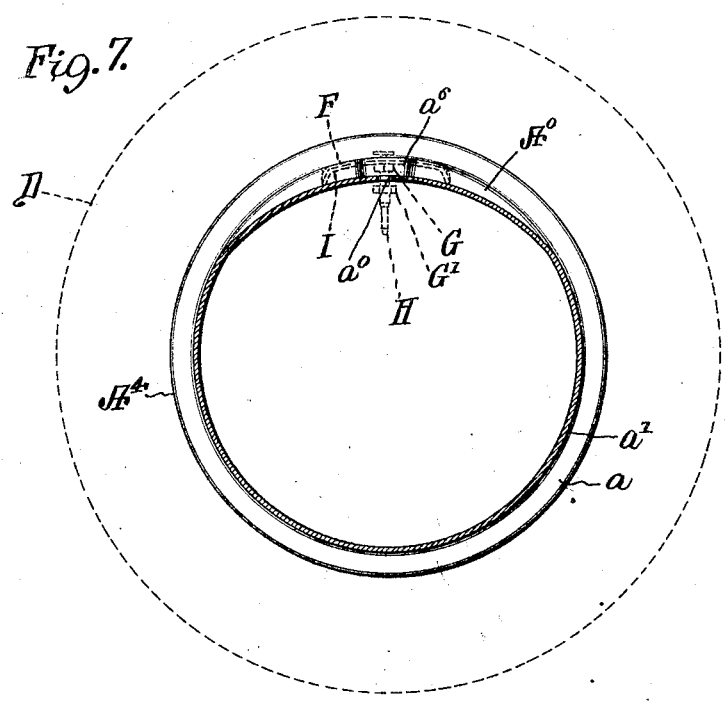
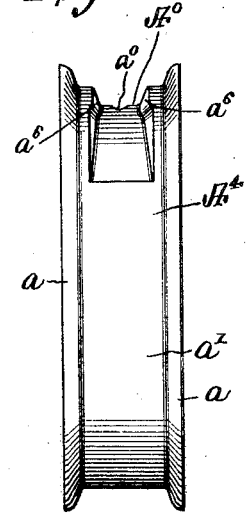
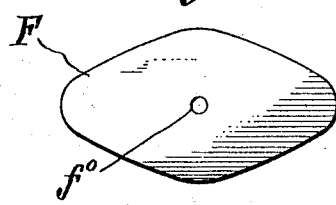
Inventor
Pierre Marcel Bourdon
by Wilkinson & Giusta
Attorneys.

Patented Oct. 1, 1929

1,730,261

UNITED STATES PATENT OFFICE

PIERRE MARCEL BOURDON, OF PARIS, FRANCE, ASSIGNOR TO MICHELIN ET CIE., OF CLERMONT-FERRAND, FRANCE, A CORPORATION OF FRANCE

METAL RIM FOR USE WITH PNEUMATIC TIRES

Application filed July 25, 1928, Serial No. 295,152, and in France August 10, 1927.

My present invention relates to an improved construction in deep rims for use with pneumatic tires, which is especially intended to prevent the beads of the tire from working down into the groove, when the tire becomes deflated when in use on the road, with the probable result that the tire will become disengaged from the wheel, and serious results may occur.

The liability to such accidents is greater and the danger is greater when travelling at a high rate of speed.

Various arrangements have been provided to protect against such accidents, such for instance as are shown in my United States patents No. 1,652,146, granted December 6, 1927, entitled Deep rims for pneumatic tires, and No. 1,654,380, granted December 27, 1927, entitled Means for securing tires on rims. In such devices, it is common to provide bridge pieces, made of rubber, rubber and canvas, or other soft flexible material, which bridge pieces are so mounted with regard to the groove in the rim that they will obstruct the beads of the deflated tire, and prevent them from working down into the groove.

A plurality of these bridge pieces or obstructions may be employed, but I have noted that with a deep groove sufficiently narrow, the usual rubber bridge piece, or other similar piece, placed in the neighborhood of the valve stem provides a suitable safety device to prevent the beads from descending into the groove.

Therefore, it may only be necessary to use a single bridge piece at the place stated.

On the other hand, it is not always desirable to have grooves sufficiently narrow throughout their whole length.

According to my present invention, I reduce only through a certain portion of the rim, in the neighborhood of the valve stem, the width of the groove, so that this contracted portion of the rim will serve as a safety arrangement as will be hereafter described.

Such an arrangement is especially desirable where the deep groove extends only through a part of the circumference of the rim, or where the bottom of the groove is eccentric with regard to the axis of the wheel; in which case, it will be sufficient to provide a narrowing of the groove for a short distance only in the neighborhood of the valve stem, and place in this location a bridge piece, or other similar device, to give absolute safety from the working of the beads into the groove with the result aforesaid.

The alterations in the shape of the groove can be made in different ways, for instance by bending in or shaping the side walls of the groove adjacent to the perforation for the valve stem, or by supplying filling pieces in the groove, which will narrow the same, which filling pieces may be solid or hollow, and may be made of metal, rubber, or any other suitable material.

The circumferential length of the narrowed portion may be varied within reasonable limits, and can be, for instance, from four to eight inches in the neighborhood of the valve stem, or this narrowed portion can also extend through a large part of the circumference of the rim.

My invention will be more fully understood after reference to the accompanying drawings in which, like parts are indicated by similar reference symbols throughout the several views, and in which—

Figure 3 is a diagrammatic view showing a section through the circumference of a rim, in which the deep groove extends throughout the entire length of the rim, and in which fixed bridge pieces, or other similar devices, are provided, while the groove itself is contracted only adjacent to the valve stem.

Figure 4 is a similar view to Figure 3, but shows a rim provided with an eccentric deep groove, which is contracted only in the region adjacent to the valve stem.

Figure 5 shows a section along the line 5—5 of Figure 4, and looking in the direction of the arrows.

Figure 6 is a plan view of the rim, having the deep groove extending through a portion only of its circumference, and this portion contracted only adjacent to the perforation for the valve stem.

Figure 7 shows a section along the line 7—7 of Figure 6, and looking in the direction of the arrows, with the tire and valve stem indicated in dotted lines.

Figure 8 is a side elevation of the rim shown in Figures 6 and 7.

Figure 9 illustrates a form of rubber pad or reinforcing patch carried by the inner tube through which the valve stem passes.

Figure 1:
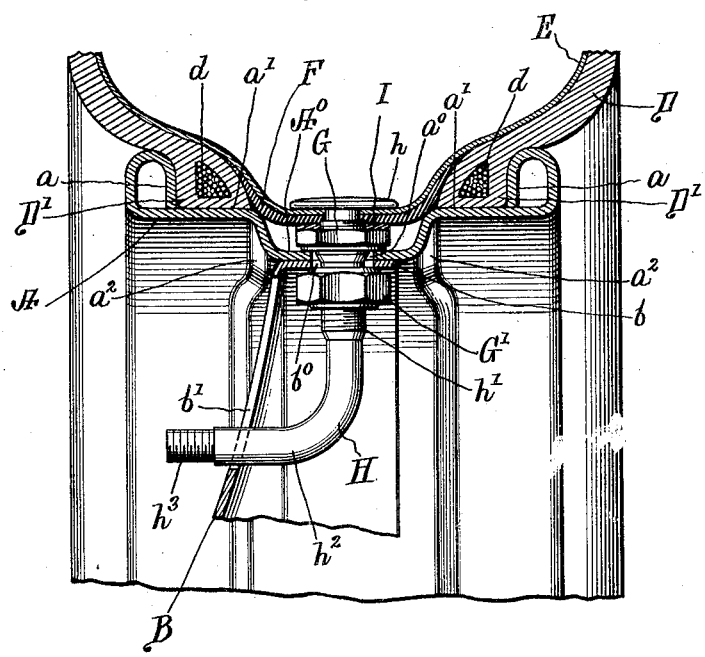
Figure 1 is a sectional elevation across a deep groove rim, showing the tire mounted therein with the valve stem in elevation, the section of the rim being taken through the perforation for the valve stem, and the side walls are shown as pinched in to narrow the groove in the region adjacent the valve stem.
Figure 2:
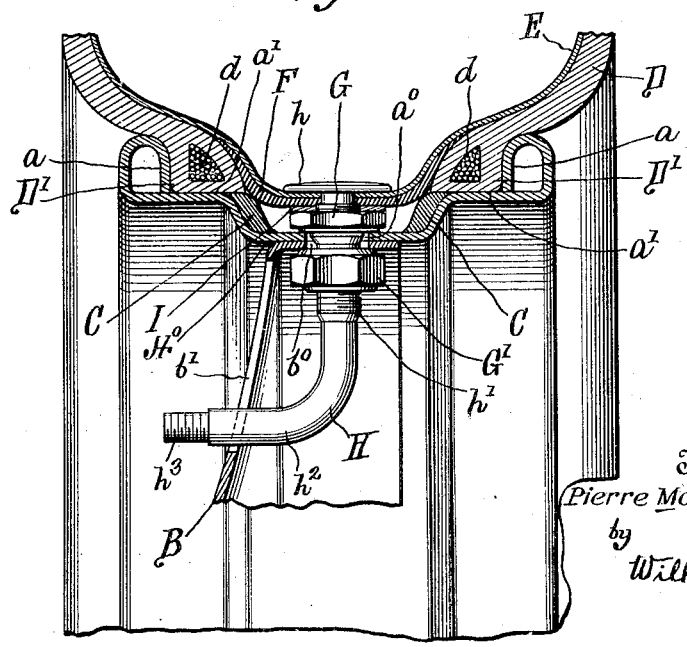
Figure 2 is a similar view to Figure 1, but shows a continuous deep groove with filling pieces supplied to narrow the groove adjacent to the valve stem.

Referring first to Figures 1 and 2. A represents a rim provided with suitable side flanges $a$, between which there is a channel for the tire provided with cylindrical shoulders $a'$, on which the beads of the tire normally engage. This channel is provided with a deep groove $A°$ throughout all or part of its circumference, as will be hereinafter more fully explained, and in this deep groove portion, the rim is perforated, as at $a°$, to receive the valve stem.

This rim is mounted on the body of the wheel in any convenient way. In Figures 1 and 2, I have shown a dished disk plate B flanged, as at $b$, on which flange the rim is mounted, which flange is perforated, as at $b°$, to permit of the passage therethrough of the valve stem, and if the valve stem is bent, as shown, this dished disk may be provided with a slot $b'$ to permit of the passage therethrough of the valve stem.

In Figure 1, I have shown the deep groove $A°$ narrowed in the region of the valve stem by bending in the walls, as at $a^2$, while in Figure 2, the deep groove $A°$ is uniform throughout the circumference of the wheel, but is narrowed in the region of the perforation $a°$ by means of a filling piece C, mounted at opposite sides of the deep groove, so as to narrow the channel of the deep groove in the region of the valve stem.

D represents a tire casing which may be of the usual, or any convenient, type. In the construction shown in Figures 1 and 2, I have shown the tire casing, having the beads $D'$ of the straight side type, and reinforced with the usual wires $d$, but other types of tire casings may be used, if desired.

E represents the inner tube, which is provided in the region of the valve stem with the usual tapered reinforcing strip or patch F, and through the inner tube and this reinforcing patch, the valve stem H passes.

This valve stem is provided with the usual head $h$ and the screw threaded portion $h'$, on which the nuts G and G' are mounted.

Between the nut G and the reinforcing patch F, the curved metallic plate I is clamped, which plate projects downward at each end into the deep groove, and prevents the inner tube from cutting. The nut G' holds the valve stem in place on the wheel, and for convenience in operation, the outer end of the valve stem may be bent outward, as shown at $h^2$, and screw threaded, as at $h^3$, to receive the usual cap, not shown.

As it will be seen, with either form of device, when the tire is inflated, the reduced width of the deep groove will prevent the reinforced portion of the inner tube from being pressed down into the deep groove at that point, and consequently the beads cannot be moved into the deep groove accidentally or otherwise, until the nut G' is unscrewed and the valve stem forced inward, which may be readily done, when the inner tube is deflated.

In the construction shown in Figures 1 and 2, the deep groove is narrowed in the region adjacent the valve stem opening, and the rest of the deep groove may continue throughout the circumference of the wheel, and be otherwise obstructed at other portions of the groove; or the deep groove may extend only through a portion of the rim, or may be eccentrically disposed, as will now be described.

Referring to Figure 3, $A^2$ represents a circular rim, having a circular deep groove $A°$ extending throughout its entire circumference, and having bridge pieces K projecting into said groove at different points to prevent the tire beads from working down into this deep groove, when the tire is deflated. These bridge pieces may be of rubber, or other material, and may be held in place in any convenient way, as by the bolts and nuts $k$ and $k'$.

The two upper bridge pieces, shown in Figure 3, are spaced apart at somewhat less than 180°, and between these two the deep groove $A°$ is narrowed, as at $a^4$, which may be done either by bending the metal in, or by the filling pieces, as already described in connection with Figures 1 and 2.

At this narrowed portion, the perforation $a°$ for the valve stem H is provided, and this valve stem carries the curved bridge plate I, as already described.

The valve stem passes through the reinforcing patch F carried by the inner tube, as previously described, and as shown in dotted lines in Figure 3; and thus the parts of the inner tube attached to the valve stem will serve to obstruct the entrance of the beads of the tire into the deep groove at the point stated, unless the inner tube is deflated, and the valve stem pushed outward, as already described.

In the form of device shown in Figures 4 and 5, the rim $A^3$ has the deep groove $A°$ deepest in the region of the valve stem, and vanishing at the opposite side of the tire. In such cases, the bridge pieces, such as shown at K in Figure 3, may be omitted, and the narrowing of the side walls of the deep groove in the region of the valve stem will suffice.

This narrowing is shown at $a^5$, and may be effected either by bending in the metal in the side walls, or by filling pieces, as previously described.

While I have shown in Figures 4 and 5, a disk wheel having the disk B' of eccentric construction, the rim may be mounted on any suitable type of wheel, and I do not mean to limit its use to the wheel bodies of the type shown in said figures.

In Figures 6, 7 and 8, I have shown a rim $A^4$ having the usual channel $a'$ between the flanges $a$, but with the deep groove $A^\circ$ extending only through a limited portion of the circumference of the rim adjacent to the opening $a^\circ$ for the valve stem H.

The side walls are shown as contracted by bending in the metal, as at $a^6$, by which the same result may be secured as by the use of filling pieces, as already described with reference to Figure 2.

In Figure 9, I have shown a convenient form of pad or reinforcing patch F, which may be made of rubber, or rubber and canvas, or other suitable material, and cemented, or otherwise attached to the inner tube in the region of the valve stem, which patch is perforated as at $f^\circ$ to permit of the passage therethrough of the valve stem.

In any of the various forms of the device hereinbefore described, it will be seen that the deep groove is narrowed in the region of the valve stem, and that the parts carried by the valve stem, when the tire is mounted on the wheel, will prevent the beads from working into the deep groove when the tire is deflated, no matter what strains may be placed upon the tire; and that the tire cannot be removed until the valve stem is forced inward, clearing the deep groove, which can only be done when the nut G' is removed, and the valve stem forced inward, causing the adjacent portions of the inner tube to be forced into the cavity of the tire casing.

Thus I provide a very simple and efficient safety device, which will prevent the tires being worked off the wheels, when blow-outs occur, whether running at high speed or not.

While I have illustrated and described various embodiments of the invention in its preferred forms, it will be obvious that various changes might be made in the construction, combination and arrangement of parts, which could be used without departing from the spirit of my invention, and I do not mean to limit the invention to such details, except as particularly pointed out in the claim.

Having thus described my invention, what I claim and desire to secure by Letters Patent of the United States is:—

A metal rim for use with pneumatic tires provided with a hole for the valve stem and with a channel and side flanges, a groove projecting radially inwards from said channel adjacent said hole, with bead receiving shoulders on each side of said groove, the width of said groove between said shoulders being restricted along that portion of its length contiguous to said hole.

In testimony whereof I have affixed my signature.

PIERRE MARCEL BOURDON.